(12) United States Patent
Boesch

(10) Patent No.: US 8,061,464 B2
(45) Date of Patent: Nov. 22, 2011

(54) TRACTION AND STABILITY CONTROL SYSTEM AND METHOD FOR A VEHICLE WITH MECHANICALLY INDEPENDENT FRONT AND REAR TRACTION WHEELS

(75) Inventor: Mathew A. Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 12/099,834

(22) Filed: Apr. 9, 2008

(65) Prior Publication Data
US 2009/0255746 A1 Oct. 15, 2009

(51) Int. Cl.
B60K 28/16 (2006.01)
G06F 19/00 (2006.01)

(52) U.S. Cl. ............ 180/197; 701/69; 180/243

(58) Field of Classification Search ........ 180/197, 180/243; 701/69
See application file for complete search history.

(56) References Cited

U.S. PATENT DOCUMENTS

| | | | |
|---|---|---|---|
| 6,575,870 B2 * | 6/2003 | Kitano et al. ............ 477/3 |
| 6,691,013 B1 | 2/2004 | Brown | |
| 7,040,439 B2 | 5/2006 | Kowatari et al. | |
| 7,073,616 B2 | 7/2006 | Itoh et al. | |
| 7,093,912 B2 | 8/2006 | Brown et al. | |
| 7,104,617 B2 | 9/2006 | Brown | |
| 7,114,589 B2 | 10/2006 | Kowatari et al. | |
| 2002/0041167 A1 | 4/2002 | Kitano et al. | |
| 2005/0127750 A1 | 6/2005 | Fuhrer et al. | |
| 2005/0178592 A1 | 8/2005 | Yamamoto et al. | |
| 2006/0108161 A1 | 5/2006 | Feliss et al. | |
| 2006/0124374 A1 * | 6/2006 | Katada et al. ............ 180/233 |
| 2006/0219454 A1 * | 10/2006 | Itoh et al. ............... 180/197 |
| 2006/0237250 A1 | 10/2006 | Kowatari et al. | |
| 2007/0038340 A1 | 2/2007 | Skiguchi et al. | |

* cited by examiner

Primary Examiner — Tony H. Winner
Assistant Examiner — Jacob Knutson
(74) Attorney, Agent, or Firm — David B. Kelly; Brooks Kushman P.C.

(57) ABSTRACT

A vehicle powertrain with mechanically independent sets of front and rear traction wheels has separate motive power units. An electronic control system including traction wheel slip control is electronically coupled to a first motive power unit and to a second motive power unit to separately establish maximum rear wheel traction and maximum front wheel traction. Independent requests are made for an increase or a decrease in wheel torque for one set of traction wheels and an increase or decrease in wheel torque for the other set of traction wheels thereby improving acceleration performance and enhancing vehicle stability.

19 Claims, 5 Drawing Sheets

TRACTION AND STABILITY CONTROL SYSTEM AND METHOD FOR A VEHICLE WITH MECHANICALLY INDEPENDENT FRONT AND REAR TRACTION WHEELS

BACKGROUND OF THE INVENTION

1. Field of the Invention

The invention relates to a powertrain for a hybrid electric vehicle with front and rear driving axles that are mechanically independent.

2. Background Art

It is known design practice for a hybrid electric vehicle powertrain to use traction controlled systems and stability control systems for the vehicle. These separate systems usually are interfaced in a powertrain assembly that cannot independently control each driving axle. More recent design concepts for hybrid electric vehicle powertrains use a mechanically independent electric motor drive for one of the axles as the other axle is powered by an internal combustion engine. Examples of hybrid electric vehicle powertrains with that configuration are disclosed in U.S. patent publications US 2002/0041167 and US 2005/0178592. A vehicle chassis dynamics control system for such hybrid electric vehicle powertrains cannot independently request the powertrain to adjust (increase or decrease) driving torque for one set of traction wheels and to separately adjust torque for the other set of traction wheels.

If a traditional interface for the separate sets of traction wheels is used in a hybrid electric vehicle powertrain with two sets of traction wheels, it may be necessary to apply friction braking at a slipping axle in order to achieve traction control if a powertrain controller does not reduce traction wheel driving torque sufficiently to avoid wheel slipping. Application of friction braking to a traction wheel that has minimal traction will oppose torque distribution to one set of traction wheels thereby wasting energy and degrading acceleration performance for the vehicle.

Unlike a hybrid electric vehicle with two sets of traction wheels and a center differential that provides a mechanical connection between the driving axles for the traction wheels, a hybrid electric vehicle with independent driving axles does not include a center differential assembly for maintaining good acceleration performance by redirecting driving torque from an axle with slipping traction wheels to the axle that has better traction. In a HEV with separate front and rear powertrains and no center differential, therefore, application of friction braking alone cannot redirect torque to the axle with better traction available. Further, if friction brakes are applied to the traction wheels that have low traction, the brakes may have a tendency to degrade both the stability of the control system and acceleration performance.

SUMMARY OF THE INVENTION

It is an objective of the invention to provide a powertrain for a hybrid electric vehicle with independent power sources that will avoid undesirable characteristics of known mechanically independent electric drives. The invention will provide improved powertrain efficiency and avoid degradation of stability control while improving vehicle acceleration performance. The invention includes a controller that provides an interface between a chassis stability and traction control system and a powertrain control system with dual power sources so that application of friction braking to both traction wheels of an axle with minimal traction can be delayed or reduced in its time of application.

According to another feature of the invention, a chassis traction controller requests a reduction of powertrain torque only at the axle that has reduced traction, thereby avoiding a need for frequent use of friction brakes to avoid slipping of the traction wheels for one driving axle without affecting the ability of the powertrain to develop traction wheel torque at the other driving axle. This maintains good acceleration performance.

According to another feature of the invention, the powertrain of the invention controls traction effort for the traction wheels for one driving axle while avoiding an accompanying loss of energy and degradation of stability control.

Another feature of the invention is maintenance of optimum traction effort at each traction wheel of a hybrid electric vehicle with two driving axles wherein acceleration performance is maintained as traction wheel torque at either driving axle is increased or decreased.

Traction wheel speed for each traction wheel is determined and used as input data for a traction control system, which in turn develops separate traction request signals for the separate sets of traction wheels.

Although an embodiment of the invention may use a separate wheel speed sensor at each wheel, it is possible to obtain a wheel speed value for each wheel at any given instant using less than four speed sensors. For example, if wheel speed for one wheel is measured, the speed of the other wheels at a given instant can be computed since the mechanical torque ratios of the gearing in the transmission and differentials would be a known constant and the speed of the one wheel would be a known variable at that instant.

According to a still further feature of the invention, each traction wheel is provided with a friction brake for retarding traction wheel speed under the control of a brake control module thereby avoiding wheel slip.

The invention can improve vehicle stability during coast down conditions when the deceleration torque for one set of traction wheels causes more wheel deceleration than surface conditions can accommodate. Slipping on those wheels under such conditions is controlled so that loss of lateral tractive effort is avoided during cornering of the vehicle in a steering maneuver as well as during straight-ahead driving. In this manner, a tendency to under-steer is avoided should the steerable wheels of the vehicle have too much drag torque. Further, a tendency to over-steer due to excessive driving torque at the non-steerable wheels can be avoided.

PARTICULAR DESCRIPTION OF AN EMBODIMENT OF THE INVENTION

Figure 1:
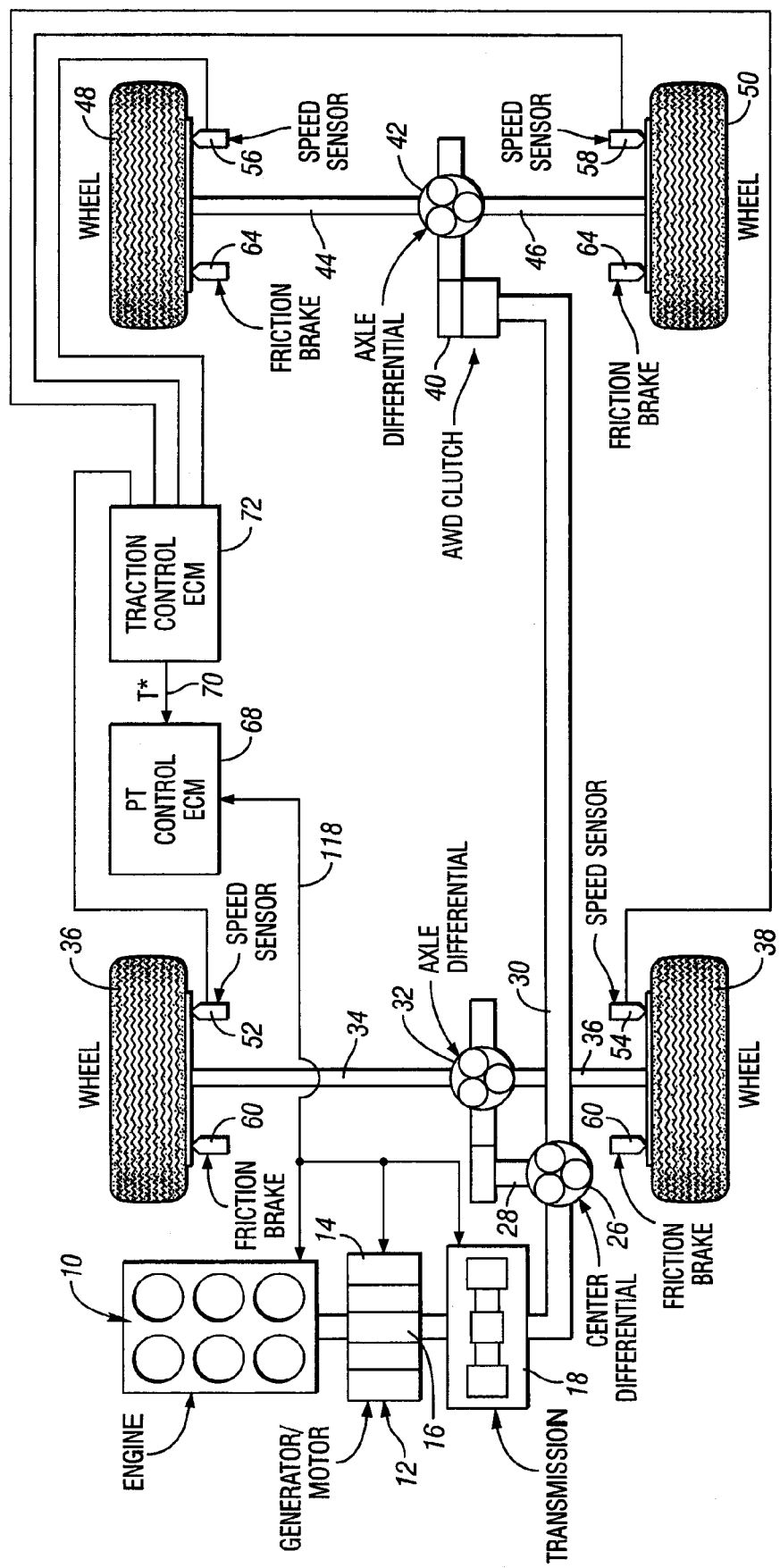
FIG. 1 is a schematic drawing of a known all-wheel drive hybrid electric vehicle with a common powertrain for distributing torque to front and rear drivelines.

FIG. 1 schematically illustrates an all-wheel drive hybrid electric vehicle powertrain with an engine shown at 10 and a generator-motor shown at 12. The engine and the generator-motor are a source of motive power. The engine 10 includes a torque output crankshaft drivably connected to a rotor of the generator-motor.

When the generator-motor is in a torque delivery mode, electric power is distributed to generator-motor windings schematically, shown at 14, so that the rotor torque schematically, shown at 16, augments engine power distributed to a geared transmission schematically shown at 18.

The torque output shaft of the transmission 18 is delivered to a center axle differential 20. Typically, the differential 20 would include a differential carrier connected drivably to the power output shaft of the transmission. The carrier is part of an assembly that includes pinions that drivably engage a differential side gear, one side gear being connected by gearing 28 to one axle shaft 34 and the other being connected to a rear axle driveshaft 30. Torque delivered to gearing 28 is transferred to the carrier of a front axle differential 32. Differential side gears, which engage pinions rotatably supported on the carrier, drive axle shafts 34 and 36 for front traction wheel 36 and front traction wheel 38, respectively.

The driveshaft 30 is connected through an all-wheel drive clutch as shown at 40, which couples the driveshaft to the torque input carrier of a rear axle differential assembly 42. The clutch 40, in a known powertrain, may comprise a viscous clutch, which delivers torque from the driveshaft 30 to the axle differential 42 when there is a speed differential between torque input and torque output elements of the clutch. Likewise, torque can be distributed from the rear axle differential to the driveshaft 30 during coast braking.

Differential side gears for the rear axle differential 42 are drivably connected to axle shafts 44 and 46, which are drivably coupled to rear traction wheels 48 and 50, respectively.

A speed sensor for traction wheel 36 is shown at 52. A speed sensor for traction wheel 38 is shown at 54. Speed sensors for the rear traction wheels 48 and 50 are shown, respectively, at 56 and 58.

Each traction wheel is provided with a friction brake, which may be of conventional design. The friction brakes for traction wheels 36, 38, 48 and 50 are shown, respectively, at 60, 62, 64 and 66. A powertrain control system, which includes the engine control module, shown at 68, receives a traction control signal (T*) as shown at 70, which is developed by a traction control 72 that is typically part of an electronic brake and stability control module.

If the wheel speed sensors detect a change in wheel speed indicating that a traction wheel is slipping relative to the other wheels, the traction control will trigger either of two responses. First, braking torque can be added to the slipping wheel by applying the friction brake for that wheel. The braking will increase traction at the wheel that is slipping or is in an incipient slipping state. In the case of the design of FIG. 1, the braking of one wheel in this fashion will redirect torque from the spinning wheel to wheels with better traction. It does this by reflecting the drive torque for the wheel that is braked through the axle differential for the slipping wheel to a wheel on the same axle that has better traction. If both of the wheels on that axle are slipping and the traction control system applies friction brakes to both wheels, the total drive torque for that axle is reflected through the center differential at 26 to the other axle with wheels that have better traction. Thus, the driver expectation for net acceleration torque is satisfied using the wheels that have traction available.

In a case in which overall powertrain torque is reduced in an effort to eliminate wheel slipping, traction forces may be increased. If all of the wheels are slipping or have a high probability of slipping, and the driver's expectation for acceleration cannot be met due to the limited traction available at all wheels, the traction control 72 will request an overall powertrain torque reduction by issuing a requested torque signal, as shown at 70, to the powertrain control module 68. This is done in response to wheel speed signals. This results in a reduction or elimination of wheel slippage at all wheels. The wheels will create traction without excessive slipping, but that could lead to slower acceleration.

In some instances, both wheel braking torque and reduced overall powertrain engine torque can be controlled simultaneously as a response to wheel speed signals.

Figure 2:
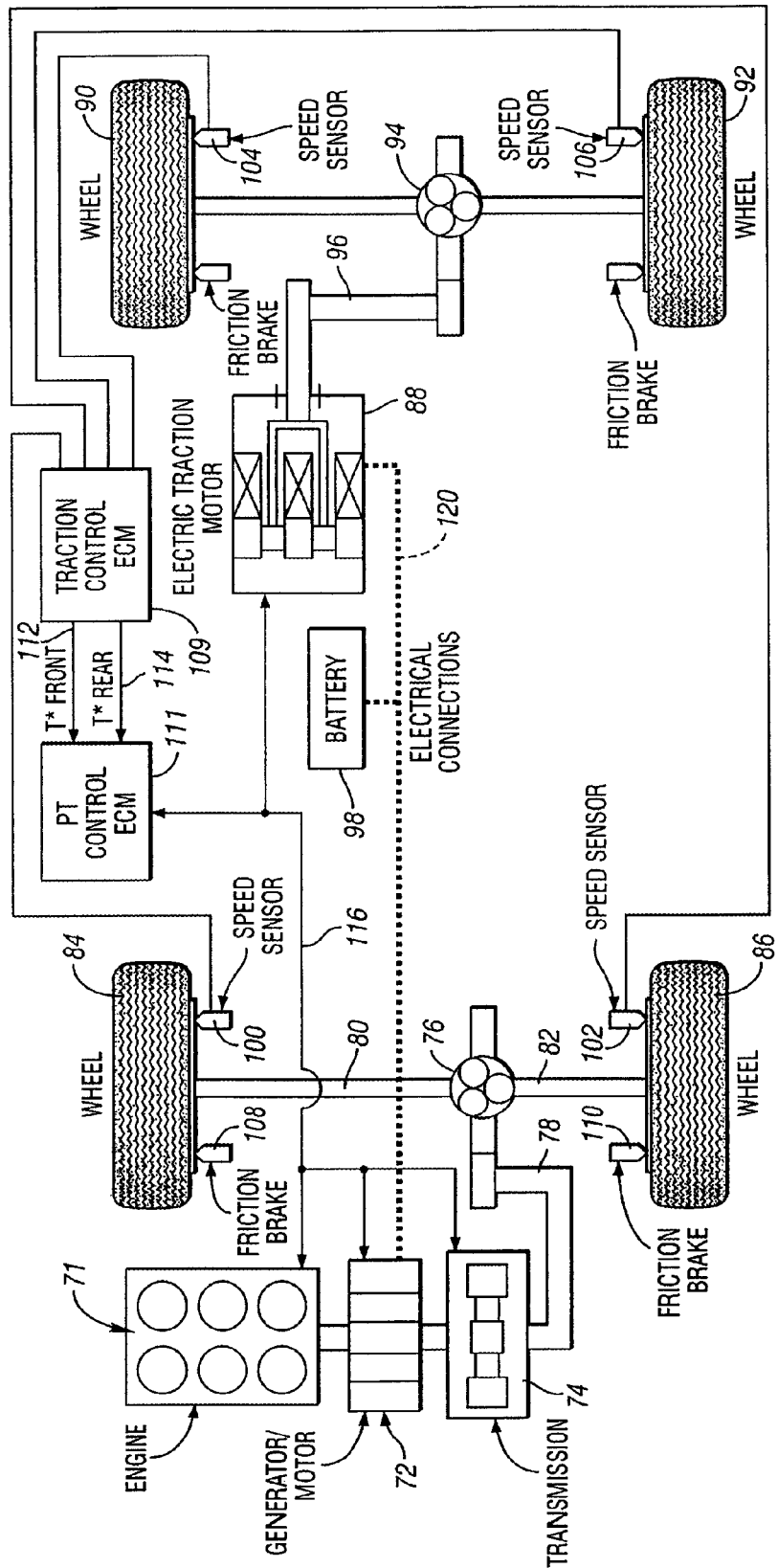
FIG. 2 is a general schematic representation of a hybrid electric vehicle powertrain with mechanically separate front and rear powertrains and drivelines, which is capable of embodying the invention.

FIG. 2 shows a schematic diagram of an overall hybrid powertrain configuration with mechanically separate front and rear powertrain and driveline assemblies. An internal combustion engine is shown at 71 and an engine-driven generator-motor is shown at 72. The engine is drivably connected to a rotor of the generator-motor 72. The torque output side of the generator-motor 72 is connected to a geared transmission 74, which delivers torque to front axle differential 76 through mechanical torque flow path 78. The driving torque is divided between front axle shafts 80 and 82 for front traction wheels 84 and 86, respectively.

Unlike the hybrid electric vehicle powertrain of FIG. 1, the hybrid electric vehicle powertrain of FIG. 2 has an electric traction motor 88 that is a power source for rear traction wheels 90 and 92. The rotor of the traction motor 88 is drivably connected to the torque input side of a rear axle differential 94 through a mechanical drive schematically shown at 96. The generator-motor 72 is electrically coupled to motor 88 and to traction battery 98. As in the case of the powertrain of FIG. 1, the powertrain of FIG. 2 has a speed sensor for each wheel. The speed sensors for front traction wheels 82 and 84 are shown at 100 and 102, respectively. The speed sensors for the rear traction wheels 90 and 92 are shown, respectively, at 104 and 106. Friction brakes for the front traction wheels 84 and 86 are shown at 108 and 110, respectively. A traction control module 109 receives speed input signals from each speed sensor so that wheel slip at each traction wheel can be detected.

The traction control module will distribute a torque signal for each set of traction wheels to the powertrain control module 111. The signal for the front traction wheels is shown at 112 and the signal for the rear traction wheels is shown at 114. A control signal area network, shown schematically at 116, electronically couples the powertrain control 111 with the traction motor 88, the engine and the generator-motor 72 as well as transmission 74.

The powertrain of FIG. 1 may have a control signal at 118; but unlike the powertrain of FIG. 2, there is no independent control of the motive power for the rear traction wheels.

Electrical connections in the electrical coupling between the generator-motor 72, the battery 98 and the traction motor 88 are illustrated in FIG. 2 by dotted lines 120. The electrical signal flow path in the control signal networks 118 and 116 in both FIGS. 1 and 2 are shown by full lines.

Figure 3:
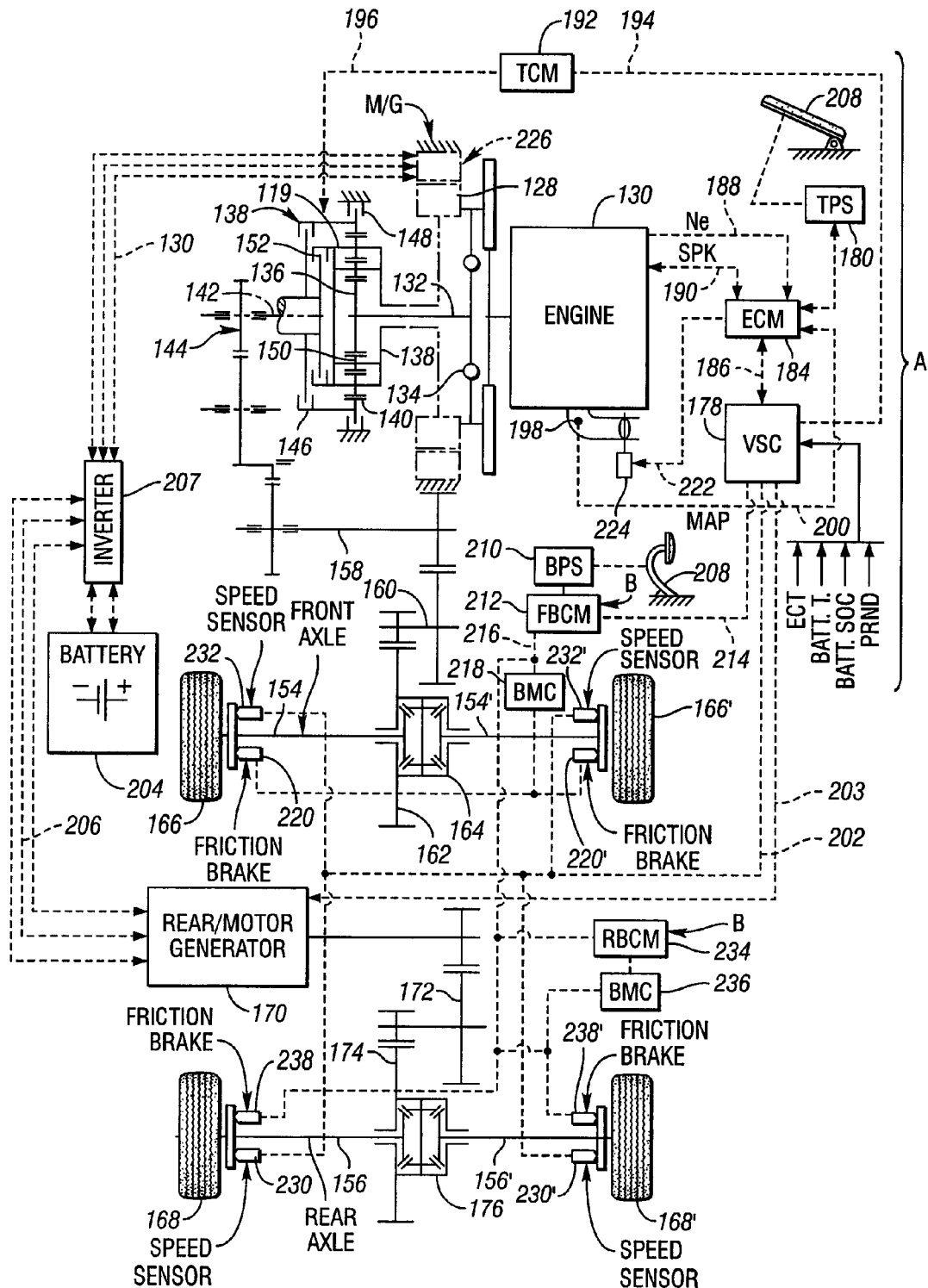
FIG. 3 is a detailed schematic representation of a hybrid electric vehicle powertrain with two driving axles and separate controllers for one axle's torque from one power source and a second axle's torque from a second power source.

FIG. 3 is a more complete schematic diagram of one embodiment of the present invention. That embodiment has a spark-ignition internal combustion engine power source, but other embodiments could use other types of powerplants, such as a diesel compression-ignition engine or one or more electric motors.

In FIG. 3, numeral 130 designates an internal combustion engine with a crankshaft and a flywheel connected to a torque input shaft 132 through a damper assembly 134. The shaft 132 is connected to sun gear 136 of a compound planetary gear unit 138. Ring gear 140 of the planetary gear unit 138 is connected to shaft 142 of torque transfer gearing 144. That connection is established by selectively engageable friction clutch 146. Ring gear 140 can be braked by selectively engageable friction brake 148.

Compound planetary pinions 150 establish a driving connection between sun gear 136 and ring gear 140. A compound planetary carrier 119 rotatably supports the compound pinions. The carrier can be connected selectively to shaft 142 by friction clutch 152.

FIG. 3 shows front driving axles at 154 and 154' and rear driving axles at 156 and 156'. The torque transfer gearing 144 distributes torque from shaft 142 to countershaft gear assembly 158, which drives a second countershaft gear assembly 160 to establish a torque delivery path to final drive gear 162. Differential gear assembly 164 is drivably connected to front drive axle 154, as well as to a companion drive axle 154'. Axles 154 and 154', as well as axles 156 and 156', typically are referred to as axle half shafts. The axles support front traction wheels 166 and 166' and rear traction wheels 168 and 168'.

A rear motor-generator 52 has an armature drivably connected through torque transfer gearing 172 to gear 174, which is connected to the differential pinion carrier for differential 176. One side gear of the differential 176 is connected to axle half shaft 156' and the other side gear is connected to axle half shaft 156.

The planetary gearing 138 is capable of providing two forward driving ratios as engine torque is distributed to the front axle half shafts 154 and 154'. A low speed ratio is effected by applying friction clutch 152 as brake 148 is applied. Ring gear 140, at this time, acts as a reaction element as driving torque is distributed through the compound planetary carrier and through the engaged clutch 152 to shaft 142.

To achieve a ratio change to a high speed ratio, clutch 152 remains applied and clutch 146 is applied, while brake 148 is released. A direct mechanical torque flow path is established also between the engine crankshaft and shaft 142 for each speed ratio when the engine is commanded to provide engine compression braking.

The powertrain system schematically illustrated in FIG. 3 is under the control of a vehicle system controller 178, which receives variable operating inputs, including an engine coolant temperature signal (ECT), a battery temperature signal (BATT.T), a battery state-of-charge signal (BATT.SOC), engine throttle position, and a driver selected powertrain drive range signal for park, reverse, neutral or drive (PRND). A throttle position sensor 180 (TPS) establishes a position signal for powertrain throttle pedal 182. That throttle position signal is transmitted to an engine control module 184 (ECM), which is in communication with the vehicle system controller 178 (VSC), as shown at 186. The engine control module 184 receives an engine speed signal from the engine 130, as shown at 188 ($N_e$). It also develops a spark retard signal for the engine, as shown at 190.

The transmission gearing 138 is under the control of a transmission control module 192 (TCM), which receives control instructions from the vehicle system controller 178 over signal flow path 194. The transmission control module controls engagement and release of the friction clutches and the brake for the gearing 138 by issuing engagement and release signals through signal flow path 196, which are received by a transmission control valve body (not shown).

An absolute manifold pressure signal (MAP) is developed at the engine intake manifold 198. The signal is distributed to the engine control module 184 over signal flow path 200.

The vehicle system controller 178 is in communication with the wheel speed sensor over signal flow path 202. The rear motor-generator 170, which communicates with vehicle system controller 178 over signal flow path 203, is powered by battery 204, the voltage distribution path between the battery and the motor-generator being indicated schematically at 206. Preferably, the motor-generator 170 is a high voltage induction motor or a permanent magnet motor. The power supply from battery 204 may be distributed to inverter 207, which establishes an electric power supply for the motor-generator 170.

The powertrain system includes a driver operated brake pedal 208 and a brake pedal position sensor 210 (BPS), which develops a signal functionally related in magnitude to pedal depression. The signal developed at the brake pedal position sensor is distributed to a front brake control module 212 (FBCM), which in turn communicates, as shown at 214, with the vehicle system controller 178. The brake control module issues a control signal through signal flow path 216 to a brake master cylinder (BMC), as shown at 218 for actuating either or both of the brakes 220 and 220'. The brake master cylinder 218 distributes brake pressure through brake pressure lines separately or simultaneously to friction wheel brake actuators 220 and 220' for traction wheels 166 and 166', respectively.

The engine control module 184 distributes a throttle position signal, as shown at 222, to a throttle controller 224 for the engine throttle.

The powertrain system illustrated in FIG. 3 has a motor-generator 226 with a rotor 128 connected drivably to the compound planetary carrier of gearing 138. The motor-generator 226 is electrically coupled by battery 204, which may be common to the motor-generator 170, the inverter 206 functioning, as shown at 130, as a part of a power distribution path. The vehicle system controller responds to its input signals, including wheel speed signals, to control rear motor generator power independently of engine power.

The configuration of the powertrain system of the invention allows for optimization of the regenerative braking such that on a tip-out of the accelerator, the electric motor-generators provide regenerative braking on their respective driving axle to slow the vehicle while at the same time sending electrical energy to the battery. If the vehicle operator commands a braking operation by depressing the brake pedal, the electric motor-generators continue to provide braking, which may be referred to as service braking, to their respective driving axle up to a regenerative limit. Any additional braking required to slow the vehicle or to stop the vehicle then can be provided by the friction braking. Compression braking by the internal combustion engine can additionally occur at the front driving axle.

The powertrain system of FIG. 3 includes speed sensors for the rear left traction wheel and the rear right traction wheel as shown at 230 and 230', respectively. Corresponding speed sensors for the front traction wheels are shown at 232 and 232'. The speed sensors are in communication with the vehicle system controller 178, which uses speed signals in an execution of a control algorithm for controlling traction torque distribution at the wheels.

A rear brake control module 234, like the front brake control module 212, is in communication with the vehicle system controller 178, the signal flow path being shown by dotted lines. Brake master cylinders 236 and 218, which are part of a brake fluid pressure system, not shown, are under the control of their respective brake control modules for actuating the front friction brakes 220 and 220' and rear friction brakes 238 and 238'.

Although the engine control module 184, the transmission control module 192 and the front and rear brake control modules are shown as stand-alone controllers in FIG. 3, they could be integrated with the vehicle system controller 178 as a single control hardware assembly.

Figure 4:
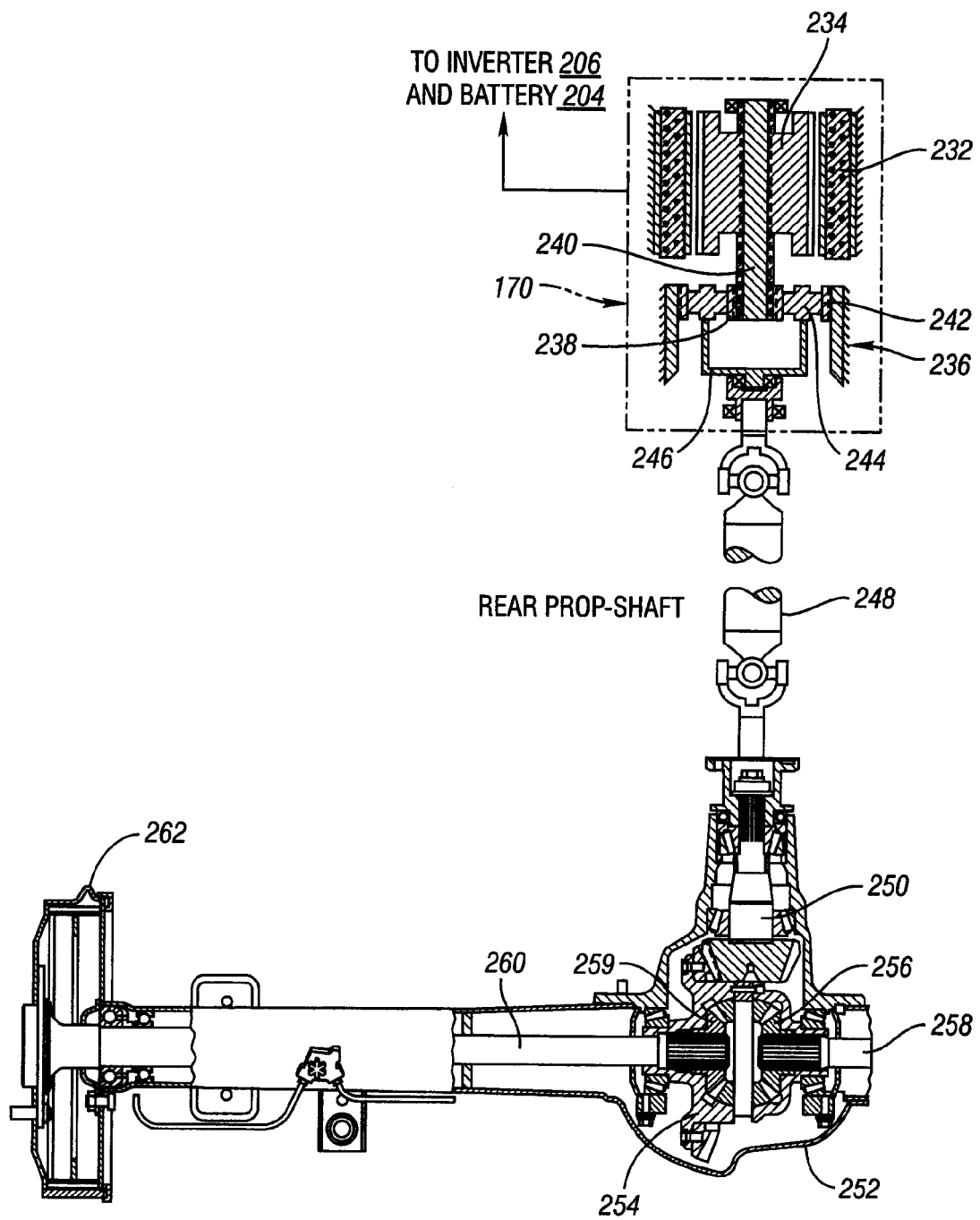
FIG. 4 is a diagrammatic view, partly in section, showing an electric motor drive for a driving axle in a powertrain of the type illustrated in FIG. 3.

FIG. 4 shows schematically a more complete illustration of the motor-generator and rear axle and differential assembly for the embodiment of the invention shown in FIG. 3. The rear motor-generator unit, shown in FIG. 4 at 170, comprises fixed stator windings 232 and a rotor 234. A planetary gear unit 236 comprises a sun gear 238, which is drivably connected to a rotor driven shaft 240. A fixed ring gear 242 is engaged by planetary pinions 244 supported on a carrier 246. The carrier is drivably connected through a rear prop shaft assembly 248 to a differential drive pinion and drive pinion shaft 250 for the rear axle assembly.

A differential case 252 encloses a differential carrier and differential ring gear assembly as indicated at 254. The ring gear drivably engages axle drive pinion 250.

The differential carrier supports the pinion gears, which engage side gears 256 and 259 connected to rear axles 258 and 260, which are drivably connected to the right rear traction wheel and the left rear traction wheel, respectively. Each axle has a friction brake, such as that indicated in FIG. 4 at 262.

Each of the axle differentials and the center differential in the previously described embodiment may function in a manner similar to the axle differential illustrated in FIG. 4. That is, torque distributed to the differential ring gear is transmitted to the differential carrier. The pinions on the carrier effectively divide the torque delivery to each of the differential side gears, and hence to the respective traction wheels connected to the side gears.

In the case of a design such as that shown in FIG. 1 where a mechanical torque delivery path is established from a center differential to the rear axle differential, a wheel that is slipping can trigger application of a wheel brake to the slipping wheel or a signal to the engine control module to reduce overall powertrain torque. This is done typically by retarding ignition spark in an internal combustion engine with spark ignition. Torque reduction can accomplished also, of course, by reducing fueling of the engine. On the other hand, if braking torque is applied to the slipping wheel, the speed of that wheel will be reduced and the braking torque will be redirected from the spinning wheel to the wheels with better traction. This is done by the axle differential. If two wheels on the same axle are spinning, braking can be applied to both spinning wheels so the center axle differential will redistribute driving torque to the traction wheels for the other axle so that there is no net reduction in traction available for acceleration of the vehicle.

In a case in which the vehicle system controller reduces overall powertrain torque in the design of FIG. 1 to avoid traction wheel slipping, the driving torque to all of the traction wheels then is reduced by an amount that will avoid slipping. This torque reduction, however, would lead to a lower acceleration rate for the vehicle. At high vehicle driving speeds, torque is typically reduced without braking action, but in some instances, as in the case of the present invention, the controller may add braking torque simultaneously with a reduction of powertrain torque.

If the strategy described with respect to FIG. 1 is applied to the powertrain hardware configuration schematically illustrated in FIG. 2, where there is no mechanical connection between the front axle differential and the rear axle differential and where there is no center differential, the application of friction braking to a slipping wheel would reduce or eliminate slipping of that wheel, and the driving torque normally distributed to that wheel would be redirected through the differential for that axle to the other tractive wheel on the same axle. If both wheels on the same axle are slipping and braking for the slipping wheels is initiated, the lack of a center differential would make it impossible for driving torque to be reflected to the traction wheels at the opposite axle. Thus there would be an overall reduction of acceleration for the vehicle below the driver expectation for acceleration. If slipping of the traction wheels for one axle is overcome by reducing overall powertrain torque, the overall traction available for the vehicle is equal to the lesser amount of the traction available on either axle, which leads to a lower acceleration than the acceleration expected by the driver.

The present invention overcomes the deficiencies described above by providing separate control signals from the traction control system to each of mechanically independent front and rear powertrains in a powertrain as illustrated in FIGS. 2 and 3. The traction control system seen at 109 in FIG. 2, for example, distributes separate control signals to the separate powertrains for the front axle and the rear axle. In this way, the traction control system can separately reduce powertrain torque for an axle with a slipping wheel (or wheels) without reducing torque on the axle for wheels that have good traction. The traction control system 108 can distribute separate signals indicated in FIG. 2 by the symbol T*FRONT and T*REAR. This can effect separate reductions in torque distributed by the engine and by the electric traction motor 88, seen in FIG. 2. Separate wheel brake signals for activating separately the front wheel brakes and the rear wheel brakes also can be issued by the traction control module 108. This is schematically illustrated in FIG. 3, which shows friction brake control signals being delivered by the vehicle system controller 178 to the front brake control module 212 and to the rear brake control module 234.

Figure 5A:
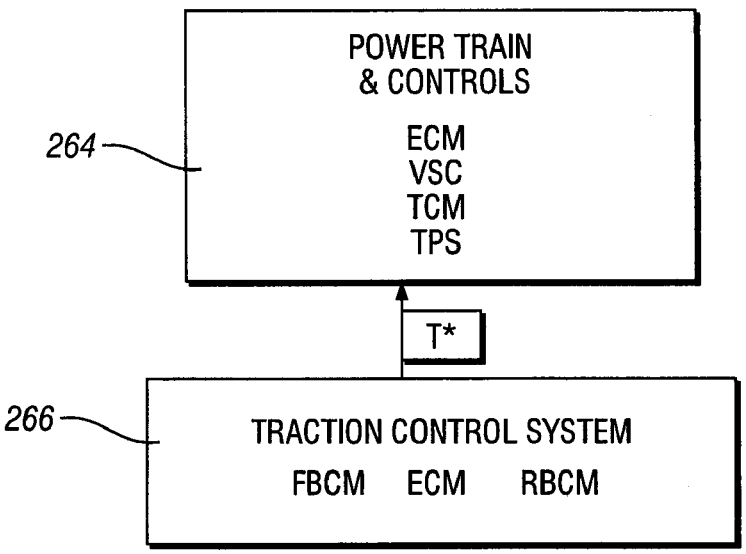
FIG. 5a is a block diagram of a common powertrain controller and traction control system for a hybrid electric vehicle.

FIG. 5A, for purposes of comparison, shows a schematic illustration of a hybrid electric vehicle with front and rear powertrains that are not independent. The traction control system issues a requested torque signal indicated at T* in FIG. 5A. The powertrain and controls and the traction control system of FIG. 5A communicate with each other, but there is only a single powertrain and powertrain control, including an independent engine control module, a vehicle system controller, a traction control module and a throttle position sensor. The powertrain and controls are indicated at 264 in FIG. 5A. The traction control system is illustrated at 266. This includes wheel brake control modules and the engine control module.

Figure 5B:
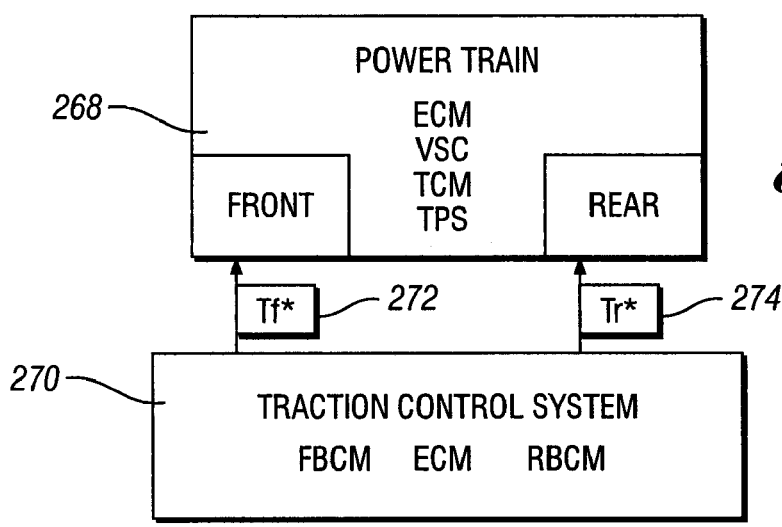
FIG. 5b is a block diagram of a control system for a hybrid electric vehicle having independently controlled front and rear traction wheels, whereby tractive effort at each driving axle is separately controlled.

In contrast to the powertrain schematically illustrated in FIG. 5A, separate front and rear powertrains of the present invention are illustrated in FIG. 5B at 268. The traction control system is schematically designated by numeral 270 in FIG. 5B. The traction control system 270 issues separate requested traction torque signals for the front axle and the rear axle as indicated at 272 and 274, respectively. These values are typically less than that for which the driver is asking according to the accelerator pedal position. This represents a request for a reduction of overall powertrain torque as described above. In some implementations, this request is defined as the absolute maximum torque that the traction control system will allow based on current road surface conditions.

If only the wheels at the front axle or only the rear axle are slipping, the control system schematically shown in FIG. 5B will deliver the torque requested accordingly to accelerator pedal position without being reduced due to the surface conditions at the other axle's slipping wheel.

The powertrain control shown in FIG. 5B is indicated in FIG. 3 by the letter "A". The traction control system seen in FIG. 5B corresponds to the brake control modules indicated at "B" in FIG. 3, as well as the engine control module.

Figure 6:
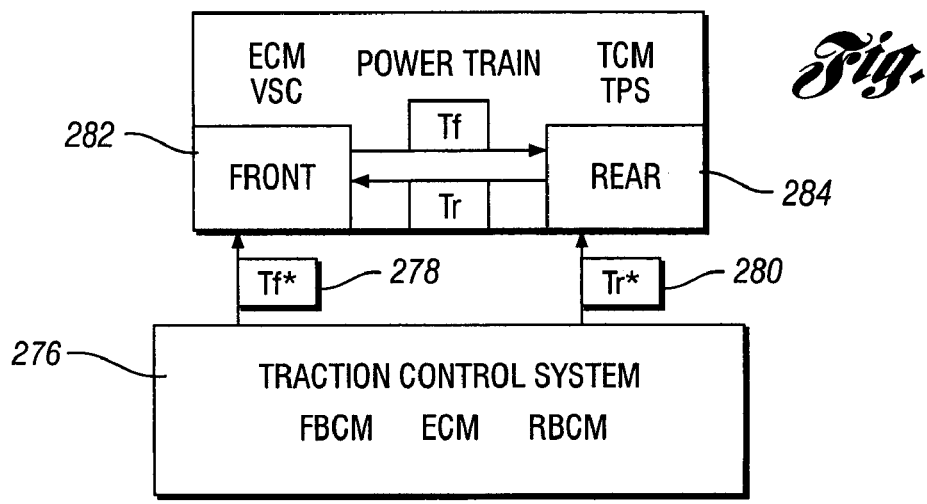
FIG. 6 is an alternate embodiment of a powertrain controller of the type illustrated in FIG. 5b, wherein controllers develop powertrain torque commands for separate sets of traction wheels and wherein one signal will request a reduced target torque only to one of the sets of traction wheels as a separate signal is developed for the other set of traction wheels to cause the other set of traction wheels to increase its target traction torque in an amount equal to the traction torque decrease at the one set of traction wheels to maintain substantially unchanged overall tractive effort.

In another embodiment of the invention, as shown in FIG. 6, there are separate powertrains for the front axle and the rear axle. This is generally similar to the embodiment of FIG. 5B. The traction control system shown at 276 in FIG. 6, however, issues a target powertrain torque "$T_f^*$", shown at 278 for one axle (e.g., the front axle), and a separate powertrain torque "$T_r^*$", shown at 280, to the other axle (e.g., the rear axle). The separate powertrains are indicated in FIG. 6 at 282 and 284. As in the case of the embodiment previously described, these target powertrain torques are defined as the absolute maximum torque that the traction control system will allow from each powertrain according to the current road surface condition for each axle.

In the case of the embodiment of FIG. 6, if only the rear axle is slipping, the traction control system will request a reduced target torque to only the rear axle powertrain because its wheels are slipping. The front axle's powertrain torque can be increased to not only the torque request for the front axle according to accelerator pedal position, but also by an additional amount commanded by the engine control module under the control of the vehicle system controller. That additional amount corresponds to the amount that the rear axle torque is being reduced by the traction control system. That is, the additional amount is equal to the difference between "$T_r^*$" and "$T_r$". If the front wheels are slipping, the amount of the torque reduced by traction control is equal to the difference between "$T_f^*$" and "$T_f$" and is added to the rear wheels.

When only the front or only the rear wheels are slipping, the traction control system can request a target torque reduction of the powertrain by controlling only that axle with wheels that are slipping without having an effect on the wheels at the other axle that have good traction available and are not slipping. The result of this is that the driver is provided with better acceleration when road surface conditions would otherwise cause one axle to have excessive slipping. The intervention of the traction control does not have to cause both front and rear axle powertrain torques to be reduced using the same signal. The separate signals are delivered independently to the independent front and rear powertrains.

In addition to the benefits achieved by the invention, improvements are made also during vehicle coast-down on slippery road surfaces. This is achieved by using the signals for the traction control system that will permit a selective request for separate drag torque reduction for each axle according to the amount of the slip that is detected by the speed sensors for that axle. The drag torque reduction at a slipping wheel can be obtained by adjusting operating variables for the independent powertrains. This may result in improved vehicle stability under conditions that otherwise may tend to cause either axle powertrain to request more wheel deceleration than the surface conditions can support. It is possible also in this fashion to achieve improved lateral traction characteristics during vehicle cornering, thereby reducing the possibility of excessive under-steering should excessive drag torque at the front wheels be requested. Over-steering also could be improved should the rear wheels be requested to provide excessive drag torque. The traction control system can adjust target axle torque values for the separate front and rear powertrains in accordance with the amount of the drag under current road surface conditions that each axle can support.

Although embodiments of the invention have been particularly described, it will be apparent to persons skilled in the art that modifications may be made without departing from the scope of the invention. All such modifications and equivalents thereof are intended to be covered by the following claims.

What is claimed:

1. A vehicle comprising front and rear powertrains for first and second driving axles, each driving axle having traction wheels;
   one powertrain having a first power source, the first power source being in a torque flow path to the first driving axle;
   a second powertrain having a second power source drivably connected to the second driving axle;
   a battery electrically connected to the first and second power sources;
   a traction torque control system; and
   a powertrain control system comprising a vehicle system controller in communication with the traction torque control system, the vehicle system controller being configured for independently controlling traction torque at each driving axle.

2. The vehicle set forth in claim 1 wherein the powertrain control system comprises a control module to reduce torque of one power source in response to changes in wheel speed indicating incipient wheel slip of traction wheels driven by that power source while maintaining unchanged overall traction torque.

3. The vehicle set forth in claim 2 wherein the vehicle system controller is configured to increase torque at a non-slipping wheel for one of the driving axles by an amount substantially equal to a decrease in traction torque at wheels with incipient slip whereby net overall tractive forces remain substantially unchanged.

4. The vehicle set forth in claim 2 wherein each driving axle comprises differential gearing, a torque input element of the differential gearing of the second driving axle being connected to the second power source and a torque output element of the differential gearing of the second driving axle being drivably connected to the traction wheels for the second driving axle.

5. A vehicle comprising front and rear powertrains for first and second driving axles, each driving axle having traction wheels;
   one powertrain having a first power source and transmission gearing, the front power source being in a torque flow path to the first driving axle through the transmission gearing;
   a second powertrain having a second power source drivably connected to the second driving axle;
   a battery electrically connected to the first and second power sources;
   wheel speed sensors for monitoring speed of the traction wheels;

a traction torque control system; and a powertrain control system comprising a vehicle system controller in communication with the traction torque control system for independently controlling traction torque at each driving axle in response to wheel speed signals.

6. A vehicle comprising front and rear powertrains for first and second driving axles, each driving axle having traction wheels;
- one powertrain having a first power source, the first power source being drivably connected to the first driving axle;
- a second powertrain having a second power source drivably connected to the second driving axle;
- a battery electrically connected to the first and second power sources;
- wheel brakes for each traction wheel;
- a wheel speed sensor for each traction wheel;
- a traction control system in communication with the wheel speed sensors; and
- a powertrain control system comprising a vehicle system controller for independently controlling traction torque at each driving axle in response to wheel speed signals whereby braking of traction wheels for one driving axle occurs without affecting traction torque at the traction wheels for the other driving axle.

7. The vehicle set forth in claim 6 wherein the vehicle system controller is configured to increase torque at non-slipping wheels for one of the driving axles by an amount substantially equal to a decrease in traction torque at wheels with incipient slip whereby net overall tractive forces remain substantially unchanged.

8. A hybrid electric vehicle comprising front and rear powertrains for first and second driving axles, each driving axle having traction wheels;
- one powertrain having an engine and a first electric machine, the engine being in a torque flow path to the first driving axle through the transmission gearing;
- a second powertrain having a second electric machine drivably connected to the second driving axle;
- the first and second electric machines being electrically coupled to a battery;
- a wheel speed sensor for sensing wheel speed for each traction wheel;
- a traction control system; and
- a powertrain control system comprising a vehicle system controller for independently controlling traction torque at each driving axle in response to wheel speed signals.

9. The vehicle set forth in claim 8 wherein each driving axle comprises differential gearing, a torque input element of the differential gearing of one of the driving axles being connected to the electric machine and a torque output element of the differential gearing being drivably connected to the traction wheels for the one driving axle.

10. A vehicle with front and rear powertrains for first and second driving axles, each driving axle having traction wheels;
- a traction wheel brake for each traction wheel;
- one powertrain having a first power source, the first power source being in a torque flow path to the first driving axle;
- a second powertrain having a second power source drivably connected to the second driving axle;
- a battery electrically connected to the first and second power sources;
- means for sensing wheel speed for each traction wheel;
- a traction control system in communication with each traction wheel brake; and
- a powertrain control system comprising a vehicle system controller, a first powertrain control module and a control module for selectively applying a traction wheel brake to a traction wheel with incipient slip in response to a detection of a difference in speed of a nonslipping traction wheel and speed of the traction wheel with incipient slip whereby overall traction for the traction wheels is maintained.

11. The combination as set forth in claim 10 wherein the powertrain control system is configured to increase torque at a non-slipping wheel for one of the driving axles by an amount substantially equal to a decrease in traction torque at wheels with incipient slip whereby net overall tractive forces remain substantially unchanged.

12. A hybrid electric vehicle comprising front and rear powertrains for first and second driving axles, each driving axle having traction wheels with wheel brakes;
- one powertrain having an engine and a motor, the engine being in a torque flow path to the first driving axle through the transmission gearing;
- a second powertrain having an electric machine drivably connected to the second driving axle;
- the electric machine and the motor being electrically coupled to a battery;
- the electric machine being adapted to recover regenerative energy and store it in the battery during vehicle coast braking;
- structure for sensing wheel speed for each traction wheel and for detecting incipient traction wheel slip; and
- a traction control system in communication with each traction wheel brake;
- the traction control system being configured to increase torque at non-slipping wheels by an amount substantially equal to a decrease in traction torque at wheels with incipient slip whereby net overall traction forces remain substantially unchanged.

13. A method for controlling tractive wheel forces in a vehicle having front and rear powertrains for first and second driving axles, each axle having traction wheels and each powertrain having a separate power source that are each electrically connected to a battery, the method comprising:
- monitoring wheel speed for the traction wheels;
- separately controlling power delivered from each power source;
- detecting incipient slip of at least one traction wheel at one driving axle by comparing a difference between speed of the at least one traction wheel and speed of a nonslipping traction wheel; and
- reducing torque delivered to the driving axle for the at least one traction wheel with incipient slip whereby slipping of the at least one traction wheel is avoided without reducing torque delivered to the other driving axle.

14. The method set forth in claim 13 wherein separately controlling power from each power source includes increasing torque at the other driving axle by an amount that is approximately equal to the amount of a torque reduction at the one driving axle while overall traction forces for the vehicle remain substantially unchanged.

15. A method for controlling traction wheel forces in a vehicle having front and rear powertrains for first and second driving axles, each axle having traction wheels and each powertrain having a separate power source that are each electrically connected to a battery, each traction wheel having a friction brake, the method comprising:
- monitoring wheel speed for the traction wheels;
- controlling power delivered from each power source;

detecting incipient slip of at least one traction wheel at one driving axle by comparing a difference between speed of the at least one traction wheel and speed of a nonslipping traction wheel; and applying a friction brake to the traction wheel with incipient slip to avoid slipping at the one driving axle without reducing torque delivered to the other driving axle.

16. A method for controlling tractive wheel forces in a vehicle having independent front and rear powertrains for first and second driving axles, each axle having traction wheels and each powertrain having a separate power source that are each electrically connected to a battery, the method comprising:

monitoring wheel speed for the traction wheels;

separately controlling power delivered from each power source;

detecting incipient slip of at least one traction wheel during vehicle coast braking by comparing a difference between speed of the one traction wheel and speed of a non-slipping traction wheel; and effecting a reduction of coast braking torque at the one traction wheel with incipient slip to avoid slipping of the one traction wheel without reducing coast braking torque at non-slipping traction wheels.

17. The method set forth in claim 16 wherein a coast braking torque at the one traction wheel is achieved by selectively adjusting operating variables for at least one independent powertrain.

18. A vehicle comprising:
one powertrain having a first electric machine and an engine drivably connected to a first driving axle;
a second powertrain having a second electric machine drivably connected to a second driving axle;
a battery coupled to the first and second electric machines;
a wheel speed sensor associated with each traction wheel; and
a controller that independently controls traction torque at each driving axle in response to signals from the wheel speed sensors.

19. A method for controlling a vehicle having independently controllable front and rear power sources connected to a battery and associated with first and second driving axles each having traction wheels, comprising:

separately controlling power delivered from each power source connected to the battery; and reducing torque delivered to one driving axle for at least one traction wheel with incipient slip to inhibit slipping without reducing torque delivered to the other driving axle.

* * * * *